United States Patent
Ikeda

(10) Patent No.: US 10,237,486 B2
(45) Date of Patent: Mar. 19, 2019

(54) IMAGE-CAPTURING APPARATUS, LENS APPARATUS AND IMAGE-CAPTURING SYSTEM

(71) Applicant: CANON KABUSHIKI KAISHA, Tokyo (JP)

(72) Inventor: Shunichiro Ikeda, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/679,302

(22) Filed: Aug. 17, 2017

(65) Prior Publication Data

US 2018/0063443 A1 Mar. 1, 2018

(30) Foreign Application Priority Data

Aug. 26, 2016 (JP) .................. 2016-165618

(51) Int. Cl.
*H04N 5/232* (2006.01)
*H04N 5/225* (2006.01)

(52) U.S. Cl.
CPC ....... *H04N 5/23287* (2013.01); *H04N 5/2254* (2013.01); *H04N 5/23209* (2013.01); *H04N 5/23258* (2013.01); *H04N 5/23274* (2013.01)

(58) Field of Classification Search
CPC ................................. H04N 5/23287

USPC ...................................... 348/208.11
See application file for complete search history.

(56) References Cited

U.S. PATENT DOCUMENTS 7,385,632 B2 * 6/2008 Shinohara .......... H04N 5/23203
348/208.16

FOREIGN PATENT DOCUMENTS

JP 3897592 B 3/2007
JP 2014-039131 A 2/2014

* cited by examiner

*Primary Examiner* — Joel W Fosselman
(74) *Attorney, Agent, or Firm* — Cowan, Liebowitz & Latman, P.C.

(57) ABSTRACT

The image-capturing apparatus includes a camera controller performing communication with a lens apparatus, and a camera image stabilizer performing, using image stabilization information, an image stabilization operation. The camera controller sets, before receiving from the lens apparatus first image stabilization information produced by the lens apparatus depending on a shake of the lens apparatus, second image stabilization information usable for the image stabilization operation, causes the camera image stabilizer, when receiving the first image stabilization information, to perform the image stabilization operation using the first image stabilization information, and causes the camera image stabilizer, when not receiving the first image stabilization information, to perform the image stabilization operation using the second image stabilization information.

13 Claims, 10 Drawing Sheets

IMAGE-CAPTURING APPARATUS, LENS APPARATUS AND IMAGE-CAPTURING SYSTEM

BACKGROUND OF THE INVENTION

Field of the Invention

The present invention relates to an image-capturing apparatus (hereinafter referred to as "a camera body") to which a lens apparatus (hereinafter referred to as "a lens unit") is detachably attachable.

Description of the Related Art

An image stabilization system is disclosed that reduces (corrects) image blur due to a camera shake such as user's hand jiggling by performing optical image stabilization in the lens unit and by performing optical or electronic image stabilization in the camera body. It is desirable for such an image stabilization system that the lens unit and the camera body cooperatively perform image stabilization control through communication so as to enhance an image stabilization effect.

Japanese Patent Laid-Open No. 2014-039131 discloses a camera system in which a lens unit that performs optical image stabilization using output of a gyro sensor and a camera body that performs electronic image stabilization using motion vectors perform image stabilization control in cooperation with each other. The camera body transmits information on an exposure time period (that is, a shutter speed) to the lens unit, and the lens unit sets multiple detection times at which the lens unit detects positions of an image stabilization shift lens depending on the shutter speed. The lens unit transmits data on a difference between a target position of the shift lens and the detected position thereof, and the camera body performs the electronic image stabilization using data on the position difference and the motion vectors.

On the other hand, a camera system is disclosed in Japanese Patent No. 3897592 that a camera body transmits time data together with shake data to a lens unit. The lens unit performs image stabilization control using, depending on a result of comparison of the time data with a predetermined value, one of the shake data previously received and the shake data newly received from the camera body.

When the camera body performs such an image stabilization process, a large communication amount and a high communication frequency make it impossible to complete the image stabilization process in a predetermined time period due to a communication delay. For example, even though a time of communication from the camera body to the lens unit is proper, a delay in transmission of image stabilization data as a response to the communication from the lens unit to the camera body makes it impossible to perform the image stabilization process depending on the data during the delay. As a result, image blur occurs. In addition, the camera body does not know when the response will be transmitted from the lens unit, which makes it difficult to determine a time of switching to use of other data.

Japanese Patent Laid-Open No. 2014-039131 does not refer to any measure against such a delay. On the other hand, the camera system disclosed in Japanese Patent No. 3897592 also cannot determine which one of the newly received data and the previously received data is used for the image stabilization control, without the shake data and the time data transmitted from the camera body to the lens unit within the predetermined time period.

SUMMARY OF THE INVENTION

The present invention provides an image-capturing apparatus and a lens apparatus capable of preventing image blur from occurring due to unsmoothness of image stabilization control caused by a communication delay therebetween.

The present invention provides as an aspect thereof an image-capturing apparatus to which a lens apparatus is detachably attachable. The image-capturing apparatus includes a camera communicator configured to enable communication with the image-capturing apparatus, a camera controller configured to perform the communication with the lens apparatus through the camera communicator, and a camera image stabilizer configured to perform, using image stabilization information, an image stabilization operation for reducing image blur. The camera controller is configured to set, before receiving from the lens apparatus first image stabilization information produced by the lens apparatus depending on a shake of the lens apparatus, second image stabilization information usable for the image stabilization operation, to cause the camera image stabilizer, when receiving the first image stabilization information, to perform the image stabilization operation using the first image stabilization information, and to cause the camera image stabilizer, when not receiving the first image stabilization information, to perform the image stabilization operation using the second image stabilization information.

The present invention provides as another aspect thereof a lens apparatus detachably attachable to the above image-capturing apparatus.

The present invention provides as yet another aspect thereof an image-capturing system including the above image-capturing apparatus and the above accessory apparatus.

The present invention provides as still another aspect thereof an image-stabilizing method for an image-capturing apparatus to which a lens apparatus is detachably attachable. The method including the step of causing the image-capturing apparatus to perform communication with the lens apparatus, the step of causing the image-capturing apparatus to perform, using image stabilization information, an image stabilization operation for reducing image blur, the step of causing the image-capturing apparatus to set, before the lens apparatus receives first image stabilization information produced by the lens apparatus depending on a shake of the lens apparatus, second image stabilization information usable for the image stabilization operation, the step of causing the image-capturing apparatus receiving the first image stabilization information to perform the image stabilization operation using the first image stabilization information, and the step of causing the image-capturing apparatus not receiving the first image stabilization information to perform the image stabilization operation using the second image stabilization information.

The present invention provides as further another aspect thereof a non-transitory storage medium storing a computer program for causing a computer to execute the above image-stabilizing method.

Further features of the present invention will become apparent from the following description of exemplary embodiments with reference to the attached drawings.

DESCRIPTION OF THE EMBODIMENTS

Exemplary embodiments of the present invention will be described below with reference to the accompanied drawings.

First, description will be made of matters common to embodiments described later.

Figure 1:
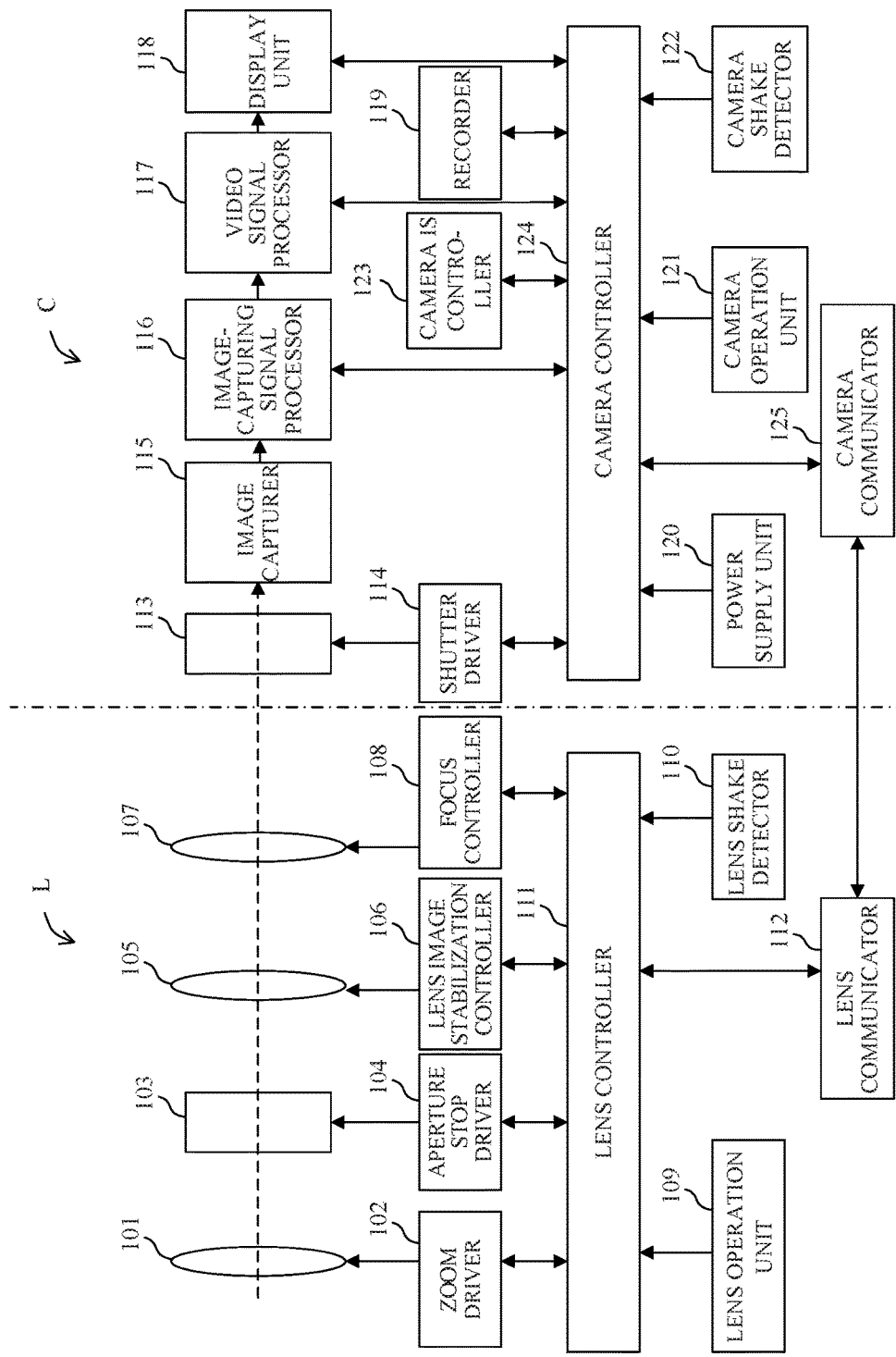
FIG. 1 is a block diagram illustrating a configuration of a camera system including a camera body and a lens unit that are embodiments of the present invention.

FIG. 1 illustrates a configuration of an image-capturing system (hereinafter referred to as "a camera system") as a representative embodiment of the present invention. This camera system is a lens-interchangeable camera system performing still image capturing and moving image capturing. The camera system includes a lens unit (interchangeable lens) L that is a lens apparatus as an accessory apparatus and a camera body C as an image-capturing apparatus. The lens unit L is detachably attached and communicably connected to the camera body C.

In the lens unit L, a magnification-varying lens 101 is moved in an optical axis direction in which an optical axis of the lens unit (that is, of an image-capturing optical system described later) L for variation of magnification. A zoom driver 102 drives the magnification-varying lens 101 in response to receiving a zoom instruction from a lens controller 111 as an accessory controller. An aperture stop 103 changes its aperture diameter to adjust an amount of light passing therethrough. An aperture stop driver 104 drives the aperture stop 103 in response to receiving an aperture stop instruction from the lens controller 111.

A shift lens (hereinafter referred to as "a correction lens") 105 as an image-stabilizing optical element is moved (shifted) in directions orthogonal to the optical axis direction to perform optical image stabilization for reducing image blur due to a lens shake (or a camera shake) described later. A lens image stabilization controller 106 controls, in response to receiving a shift instruction from the lens controller 111, the shift of the correction lens 105, that is, the optical image stabilization. The lens image stabilization controller 106 and the correction lens 105 constitute a lens image stabilizer (accessory image stabilizer).

A focus lens 107 is moved in the optical axis direction for focusing. A focus controller 108 controls driving of the focus lens 107 in response to receiving a focus instruction from the lens controller 111. The magnification-varying lens 101, the aperture stop unit 103, the correction lens 105 and the focus lens 107 constitute the image-capturing optical system.

A lens operation unit 109 includes various switches and the like that are operable by a user. A lens shake detector (accessory shake detector) 110 detects a lens shake (angular velocity) as an accessory shake added to the lens unit L due to user's hand jiggling, and outputs a lens shake signal indicating the lens shake to the lens controller 111.

The lens controller 111 includes a CPU and others, and controls whole operations of the lens unit L. Furthermore, the lens controller 111 communicates with a camera controller 124 provided in the camera body C through a lens communicator (accessory communicator) 112 provided in the lens unit L and a camera communicator 125 provided with the camera body C. The lens communicator 112 and the camera communicator 125 each have a communication circuit that enables transmission and receipt of notices and information (data) between the lens controller 111 and the camera controller 124 through multiple communication channels.

The camera body C includes a shutter 113 and an image capturer 115. The shutter 113 is opened and closed by a shutter driver 114 that receives a shutter instruction from the camera controller 124. Thereby, exposure of the image capturer 115 is controlled. The image capturer 115 includes an image sensor such as a CMOS sensor, and photoelectrically converts an object image formed by the image-capturing optical system to output an image-capturing signal as an electrical signal.

An image-capturing signal processor 116 performs various image processes on the image-capturing signal output from the image capturer 115 to produce a video signal. A video signal processor 117 performs on the video signal a process corresponding to its use. A camera image stabilization (IS) controller 123 sets an area to be clipped from the video signal (the area is hereinafter referred to as "a video clip area") for performing the electronic image stabilization. The video signal processor 117 performs a clip process for clipping the video clip area from the entire video image produced by the image-capturing signal processor 116.

The camera image stabilization controller 123 changes (shifts) a position of the video clip area depending on a camera shake signal or on a final electronic image stabilization correction amount described later, thereby performing the electronic image stabilization. The camera image stabilization controller 123 and the video signal processor 117 constitute a camera image stabilizer.

Although this embodiment describes a case where the electronic image stabilization is performed in the camera body C, optical image stabilization may be performed by shifting the image sensor in a plane orthogonal to the optical axis in the camera body C.

A display unit 118 displays an output video corresponding to the video signal output from the video signal processor 117. A recorder 119 stores (records) various data such as data of the video signal. A power supply unit 120 supplies electric power to the entire camera body C and lens unit L. A camera operation unit 121 includes various switches and others operable by the user, and outputs operation signals corresponding to user's operations to the camera controller 124.

A camera shake detector 122 detects the camera shake (angular velocity) added to the camera body C due to the user's hand jiggling, and outputs the camera shake signal corresponding to the camera shake to the camera controller 124.

A camera system controller (hereinafter referred to as "a camera controller") 124 includes a CPU and others, and controls the entire camera system. As described above, the camera controller 124 communicates with the lens controller 111 through the camera communication controller 125 and the lens communication controller 112 in the lens unit L. That is, in a state where the lens unit L is attached and electrically connected to the camera body C, the lens controller 111 and the camera controller 124 communicate with each other through the lens communication controller 112 and the camera communication controller 125.

Next, description will be made of operations of the camera system configured as above. The lens operation unit 109 includes a lens image stabilization switch for selecting on and off of the optical image stabilization. The optical image stabilization is controlled by the lens image stabilization controller 106 depending on the lens shake signal output from the lens shake detector 110. On the other hand, the camera operation unit 121 includes a camera image stabilization switch for selecting on and off of the electronic image stabilization. The electronic image stabilization is controlled by the camera image stabilization controller 123 depending on the camera shake signal output from the camera shake detector 122.

A user's on-operation of the lens or camera image stabilization switch causes the lens controller 111 or the camera controller 124 to instruct the lens image stabilization controller 106 or the camera image stabilization controller 123 to perform an image stabilization operation. The lens image stabilization controller 106 or the camera image stabilization controller 123 performs, in response to receiving this instruction, control (image stabilization control) of an optical image stabilization operation as an accessory image stabilization operation or an electronic image stabilization operation as a camera image stabilization operation.

Furthermore, the camera operation unit 121 includes an image stabilization mode selection switch for selecting, as an image stabilization mode, a first image stabilization mode and a second image stabilization mode. The first image stabilization mode is a mode in which only the optical image stabilization is performed, and the second image stabilization mode is a mode in which the optical image stabilization and the electronic image stabilization are performed in combination with each other. In the first image stabilization mode, the video clip area clipped by the video signal processor 117 is fixed to an area wider than that in the second image stabilization mode, and thereby a wider angle video signal can be output.

On the other hand, in the second image stabilization mode, the video clip area clipped by the video signal processor 117 is narrower than that in the first image stabilization mode. However, the video clip area can be shifted further widely than in the first image stabilization mode, and thereby a larger image blur can be corrected.

The camera operation unit 121 includes a shutter release switch in which a pushing operation sequentially turns on a first switch (SW1) and a second switch (SW2). A user's first stroke pushing operation turns on the SW1, and then a user's second stroke operation turns on the SW2. In response to the turning-on of the SW1, the camera controller 124 drives the focus lens 107 through the lens controller 111 and the focus driver 108 to perform autofocus. Furthermore, in response to the turning-on of the SW1, the camera controller 124 drives the aperture stop 103 through the lens controller 111 and the stop driver 104 to appropriately adjust the light amount.

Then, in response to the turning-on of the SW2, the camera controller 124 causes the image capturer 115 to photoelectrically convert the object image, and causes the image-capturing signal processor 116 to produce the video signal (video data). During the image capturing, when the lens image stabilization switch or the camera image stabilization switch is turned on, the optical image stabilization or the electronic image stabilization is performed as described above. The video data thus produced in recorded by the recorder 119.

Moreover, the camera operation unit 121 includes a movie recording switch. In response to a use's operation of this movie recording switch, the camera controller 124 starts recording moving image capturing. In response to another user's operation of the movie recording switch, the camera controller 124 ends recording the moving image capturing. During the moving image capturing, in response to turning-on of the SW1 and the SW2 by the user's operation of the shutter release switch, a process to capture a still image from the captured moving image and record the still image by the recorder 119 is performed. Moreover, the camera operation unit 121 includes a reproduction mode selection switch. In response to selection of a reproduction mode by a user's operation of the reproduction mode selection switch, the camera controller 124 stops the image stabilization control.

Figure 2:
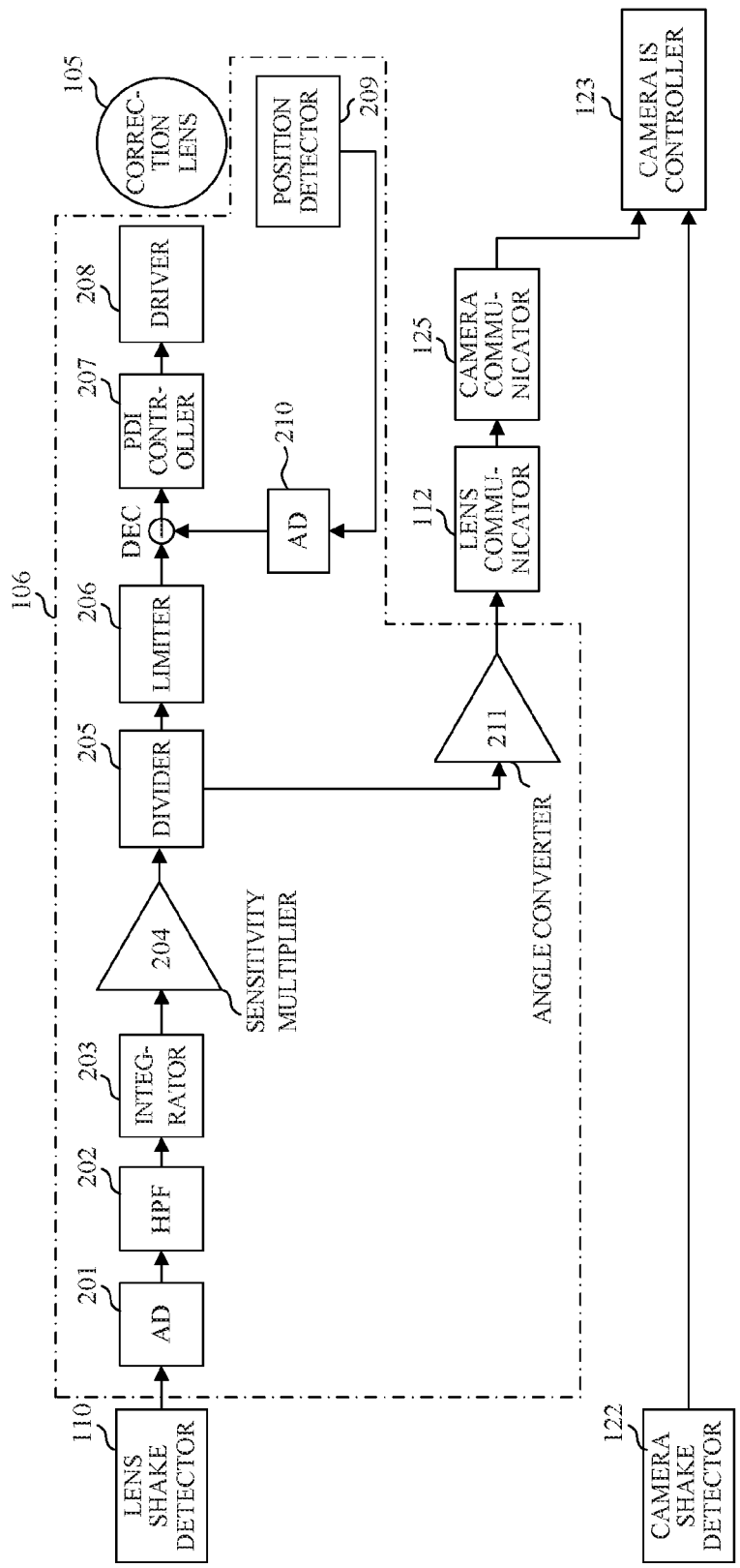
FIG. 2 is a block diagram illustrating a configuration of an image stabilization control part of the camera system.
Figure 12:
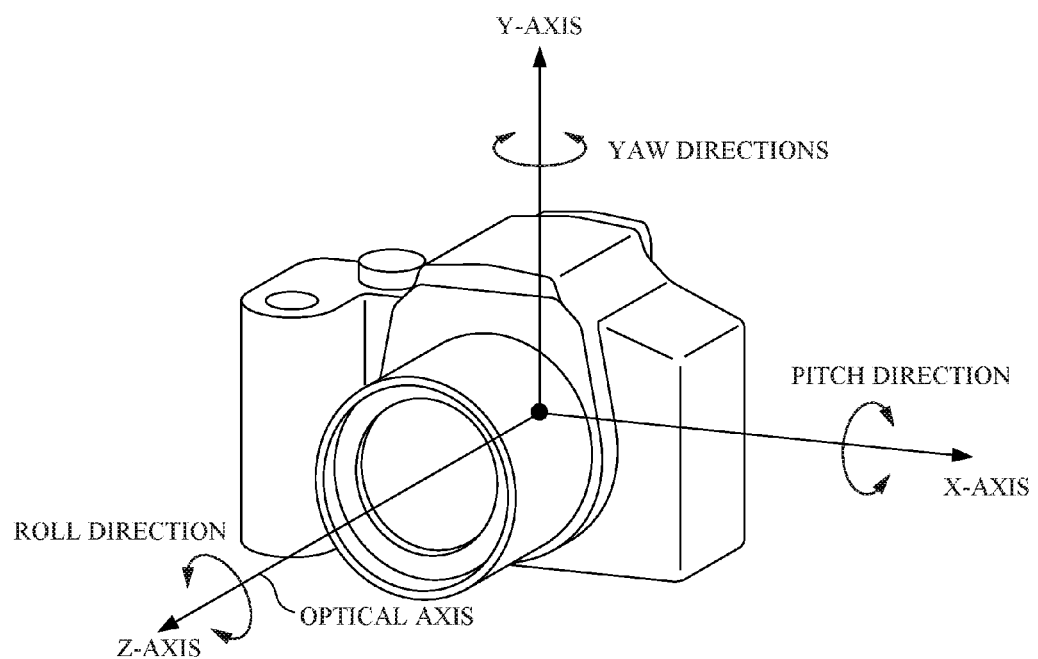
FIG. 12 illustrates pitch, yaw and roll directions in the camera body.

Next, with reference to FIGS. 2 and 12, description will be made of the image stabilization control in the camera system of this embodiment. FIG. 2 illustrates a configuration relating to the image stabilization control in the camera system (the lens shake detector 110, the lens image stabilization controller 106, the camera shake detector 122 and the camera image stabilization controller 123). FIG. 12 illustrates a pitch direction, a yaw direction and a roll direction in the camera system.

In FIG. 2, the lens shake detector 110 and the camera shake detector 122 each include a gyro sensor as a shake sensor and each detect the angular velocity to output the (lens or camera) shake signal having a voltage corresponding to the detected angular velocity. The lens shake detector 110 includes a pitch shake detector and a yaw shake detector, which are not illustrated. The camera shake detector 122 includes a pitch shake detector, a yaw shake detector and a roll shake detector, which are not illustrated.

As illustrated in FIG. 12, the following description defines, in the camera system, the optical axis of the image-capturing optical system as a Z-axis, a vertical direction at a normal position of the camera system as a Y-axis, and a direction orthogonal to the Z- and Y-axes as an X-axis. The pitch direction corresponds to a rotation direction (tilt direction) about the X-axis, and the yaw direction corresponds to a rotation direction (pan direction) about the Y-axis. The roll direction corresponds to a rotation direction about the Z-axis, that is, a direction in which an image-capturing surface of the image sensor rotates in a plane orthogonal to the optical axis. In other words, the pitch direction is a direction in which the camera system vertically tilts relative to a horizontal plane, and the yaw direction is a direction in which the camera system horizontally pans relative to a certain vertical plane; the pitch and yaw directions are orthogonal to each other.

As illustrated in FIG. 2, a pitch shake signal from the pitch shake sensor in the lens shake detector 110, which indicates a shake in the pitch direction, and a yaw shake signal from the yaw shake sensor therein, which indicates a shake in the yaw direction are each input as lens shake signal to an AD converter 201. On the other hand, a pitch shake signal from the pitch shake sensor in the camera shake detector 122, which indicates a shake in the pitch direction, and a yaw shake signal from the yaw shake sensor therein, which indicates a shake in the yaw direction are each input as the camera shake signal to the camera image stabilization controller 123.

The AD converter 201 converts the lens shake signal from the lens shake detector 110 into angular velocity data as a digital signal. A high-pass filter 202 removes an offset component and a temperature drift component from the angular velocity data. The angular velocity data from the high-pass filter 202 is input to an integrator 203. The integrator 203 integrates the angular velocity data mainly by quasi-integration using a low-pass filter to produce angular displacement data.

A sensitivity multiplier 204 converts, using an image stabilization sensitivity, the angular displacement data acquired from the integrator 203 into a total image stabilization correction amount. The image stabilization sensitivity changes depending on a focal length of the image-capturing optical system. Furthermore, the image stabilization sensitivity is corrected using a correction amount acquired by a sensitivity adjustment of the gyro sensor, and thereby a sensitivity variation of the gyro sensor is absorbed.

A divider 205 divides the total image stabilization correction amount output from the sensitivity multiplier 204 into an optical image stabilization correction amount that is a correction amount used in the optical image stabilization and an electronic image stabilization correction amount that is a correction amount used in the electronic image stabilization. Specifically, the divider 205 multiplies the total image stabilization correction amount by a coefficient K to calculate the optical image stabilization correction amount.

The coefficient K is set using following expression (1) where A represents an optical image stabilization possible range (that is, a maximum shiftable range of the correction lens 105) at each focal length of the image-capturing optical system, and B represents an electronic image stabilization possible range (that is, a maximum shiftable range of the video clip area).

$$K=A/(A+B) \quad (1)$$

As understood from expression (1), the coefficient K is 1 or less. Therefore, multiplying the total image stabilization correction amount by the coefficient K calculates the optical image stabilization correction amount (first correction amount) that is part of the total image stabilization correction amount.

A limiter 206 limits (clamps) the optical image stabilization correction amount within a shiftable range of the correction lens 105. This limitation prevents the correction lens 105 from staying at an end of its shiftable range. The limiter 206 outputs the optical image stabilization correction amount to a subtractor DEC. The subtractor DEC outputs a subtracted result to a PID controller 207.

The PID controller 207 performs position control of the correction lens 105 depending on the subtracted result from the subtractor DEC. The PID controller 207 performs the position control using a combination of P (proportional) control, I (integral) control and D (derivative) control. A driver 208 supplies an electric current for driving the correction lens 105, whose current value is controlled by a control signal output from the PID controller 207 and corresponds to the optical image stabilization correction amount, to an image-stabilizing actuator such as a voice coil motor (not illustrated) provided in the driver 208.

A position detector 209 detects a position of the correction lens 105 to output a position detection signal whose voltage depends on the detected position. An AD converter 210 converts the position detection signal as an analog signal from the position detector 209 into position detection data as a digital signal to output the position detection data to the subtractor DEC. The subtractor DEC calculates a difference (deviation) of the outputs from the limiter 206 and the AD converter 210 to output a result of the calculation to the PID controller 207. This enables feedback position control of the correction lens 105.

On the other hand, in order to calculate the electronic image stabilization correction amount to be given from the lens unit L to the camera body C, the divider 205 multiplies the total image stabilization correction amount output from the sensitivity multiplier 204 by a coefficient (1−K). The optical image stabilization correction amount is calculated by multiplying the total image stabilization correction amount by the coefficient K as described above. On the other hand, the electronic image stabilization correction amount is calculated by multiplying the total image stabilization correction amount by the coefficient (1−K). An angle converter 211 converts the electronic image stabilization correction amount (second correction amount) into angular displacement data. This conversion uses a conversion coefficient different depending on the focal length of the image-capturing optical system. That is, the conversion coefficient is changed depending on the focal length. The angular displacement data acquired by the conversion is transmitted as a lens electronic image stabilization correction amount (image stabilization information) to the camera image stabilization controller 123 in the camera body C though the lens and camera communicators 112 and 125. The camera image stabilization controller 123 calculates a camera electronic image stabilization correction amount by using the camera shake signal from the camera shake detector 122, and calculates a combined value (that is, the final electronic image stabilization correction amount) of the received lens electronic image stabilization correction amount and the camera electronic image stabilization correction amount. The camera image stabilization controller 123 performs the electronic image stabilization depending on the combined value.

Figure 10:
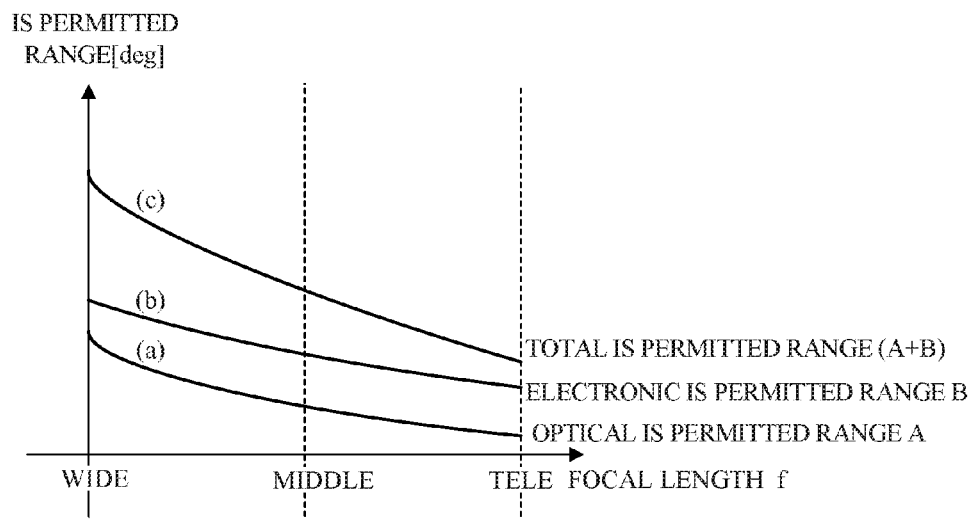
FIG. 10 is a graph illustrating a relation between focal lengths and image stabilization possible ranges.

FIG. 10 illustrates a relation between the focal length of the image-capturing optical system and the above-described optical and electronic image stabilization possible ranges. In FIG. 10, a horizontal axis indicates the focal length (zoom position) f; "Wide" indicates a wide-angle end, "Middle" indicates a middle zoom position, and "Tele" indicates a telephoto end. A vertical axis indicates each image stabilization possible range. A curved line (a) indicates the optical image stabilization possible range A, and a curved line (b) indicates the electronic image stabilization possible range B.

The optical image stabilization possible range A is set depending on optical characteristics of the image-capturing optical system (such as the focal length, a resolution and a peripheral light amount). The electronic image stabilization possible range B is set depending on a remaining video area outside the video clip area in the entire video signal. The optical image stabilization possible range A and the electronic image stabilization possible range B both change with the zoom position. Specifically, even when the lens or camera shake has the same magnification, a shift amount of the correction lens 105 to be driven for the optical image stabilization (that is, the optical image stabilization possible range A) is smaller at the wide-angle end of the image-capturing optical system than at the telephoto end, so that the electronic image stabilization possible range B changes with the optical image stabilization possible range A. The optical image stabilization possible range A and the electronic image stabilization possible range B are both managed in the image stabilization control as data on angular displacement amounts.

The correction lens 105 is shifted in the optical image stabilization possible range A illustrated in FIG. 10, and thereby the optical image stabilization is performed. The video clip area is shifted in the electronic image stabilization possible range B illustrated in the same figure, and thereby the electronic image stabilization is performed. A combination of these optical image stabilization and electronic image stabilization forms a total image stabilization possible range (A+B) illustrated by a curved line (c). FIG. 10 illustrates an example that, at the wide-angle end, the middle zoom position and the telephoto end, the optical image stabilization possible range A is 2, 0.75 and 0.3 degree, respectively, and the electronic image stabilization possible range B is 2.5, 1.6 and 1.1 degree, respectively.

Figure 11:
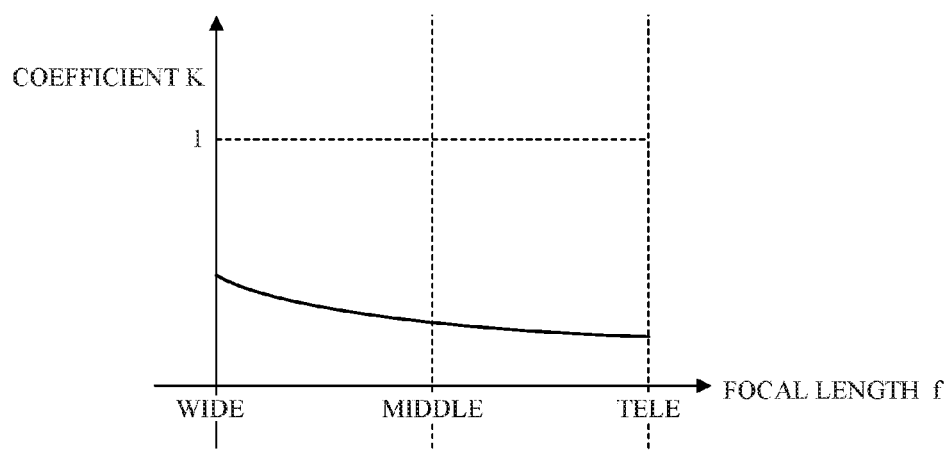
FIG. 11 is a graph illustrating a relation between the focal lengths and division coefficients.

FIG. 11 illustrates a relation between the focal length f and the coefficient K. A horizontal axis indicates the focal length f, and a vertical axis indicates the coefficient K. The coefficient K is set depending on the optical image stabilization possible range A and the electronic image stabilization possible range B. Values of the coefficient K in the example in FIG. 10 at the wide-angle end, the middle zoom position and the telephoto end are 0.444, 0.319 and 0.214, respectively. In the second image stabilization mode in which the optical image stabilization and the electronic image stabilization are performed, the correction lens 105 is driven (shifted) using the optical image stabilization correction amount calculated using the coefficient K=A/(A+B) by the divider 205, and the video clip area 105 is shifted using the lens electronic image stabilization correction amount calculated using the coefficient (1-K). Performing both the optical image stabilization and the electronic image stabilization eliminates a boundary between the optical image stabilization possible range A and the electronic image stabilization possible range B. This results in reduction of turbulence of the video due to an overshoot of the optical image stabilization.

On the other hand, in the first image stabilization mode in which only the optical image stabilization is performed, the divider 205 sets the coefficient K for the optical image stabilization to 1 and sets the coefficient (1-K) for the electronic image stabilization to 0. Thereby, the collection lens 105 is driven by the optical image stabilization correction amount as the total image stabilization correction amount.

Next, description will be made of still image capturing in the second image stabilization mode. Turn-on of the SW2 by a user's operation of the shutter release switch in the camera operation unit 121 starts an exposure operation for still image capturing. In the exposure operation, the divider 205 sets the coefficient K for the optical image stabilization to 1, and sets the coefficient K for the electronic image stabilization to 0. As a result, the optical image stabilization is performed in which the optical image stabilization correction amount is the total image stabilization correction amount.

After ending the exposure operation, the divider 205 sets the coefficient K for the optical image stabilization to A/(A+B), and sets the coefficient (1-K) for the electronic image stabilization. At the start and end of the exposure operation, in order to prevent a steep change of the optical image stabilization correction amount caused by stop and restart of the electronic image stabilization, a process is performed that gradually changes the optical image stabilization correction amount and the lens electronic image stabilization correction amount over time.

Figure 3:
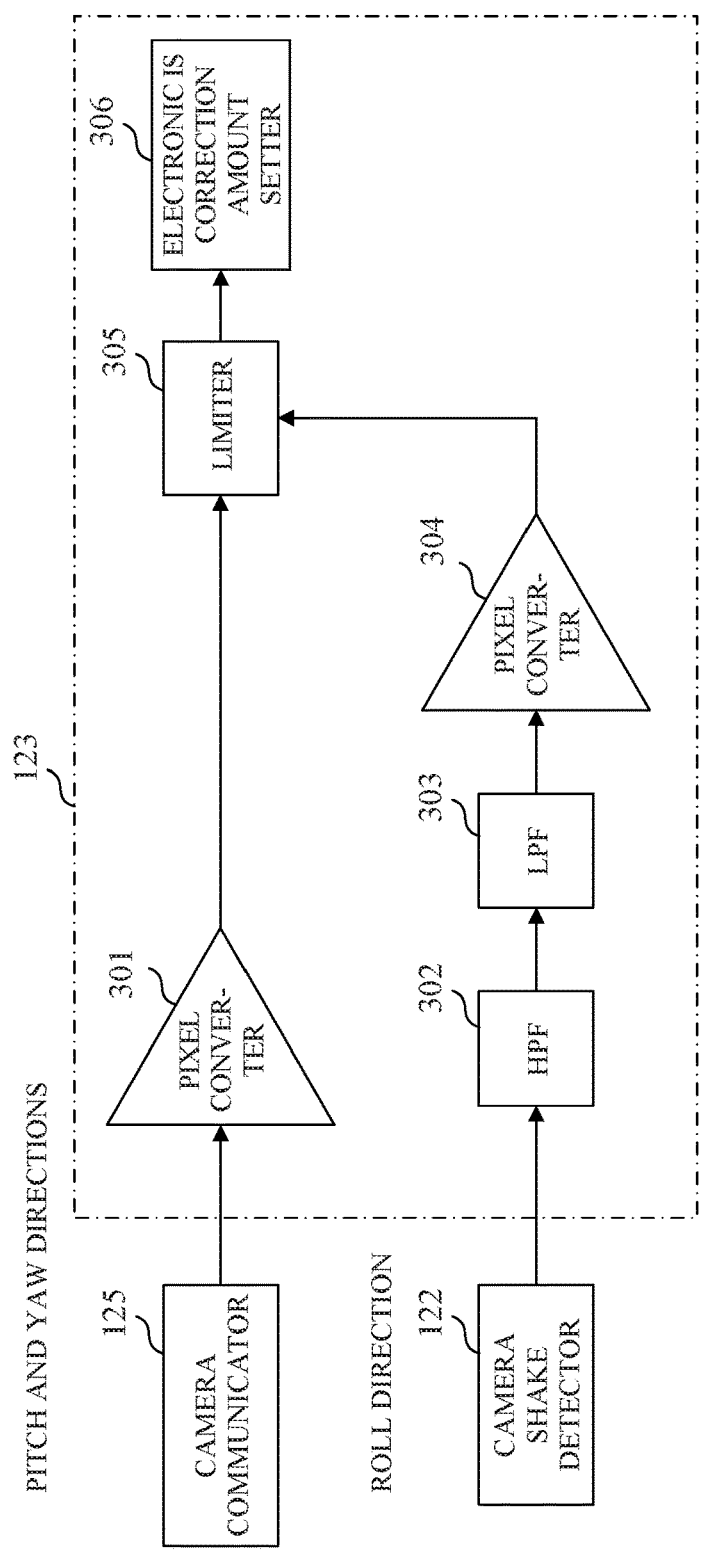
FIG. 3 is a block diagram illustrating a configuration of a camera image stabilization controller in the camera body.

FIG. 3 illustrates a configuration of the camera image stabilization controller 123. In FIG. 3, the camera controller 124 actually disposed between the camera shake detector 122, the camera communicator 125 and the camera image stabilization controller 123 is omitted. The camera communicator 125 receives, from the lens controller 111 through the lens communicator 112, pitch and yaw direction correction amounts (angular displacement amount equivalent values) as the lens electronic image stabilization correction amounts. A pixel converter 301 converts each of the lens electronic image stabilization correction amounts into a correction amount equivalent to a pixel number (the correction amount is hereinafter referred to as "a pixel number equivalent correction amount"), and outputs the pixel number equivalent correction amounts to a limiter 305. A conversion coefficient used for converting the lens electronic image stabilization correction amount to the pixel number equivalent correction amount depends on the focal length of the image-capturing optical system, and is changed with the focal length.

The camera shake detector 122 outputs a roll shake signal from the roll shake sensor to a high-pass filter 302. The high-pass filter 302 removes an offset component and a temperature drift component from the roll shake signal. Furthermore, a low-pass filter 303 reduces a high-frequency noise of the roll shake signal to output the roll shake signal after the noise reduction to a pixel converter 304. The pixel converter 304 converts, as well as the pixel converter 301, the roll shake signal into a pixel number equivalent correction amount, and outputs the pixel number equivalent correction amount to a limiter 305.

The limiter 305 limits (clamps) the pixel number equivalent correction amounts from the two pixel converters 301 and 304 within a pixel number corresponding to the electronic image stabilization possible range B. That is, limit levels are respectively set for three correction axis directions that are the pitch, yaw and roll directions. A correction amount exceeding the limit level is input to an electronic image stabilization correction amount setter 306. The electronic image stabilization correction amount setter 306 sets the electronic image stabilization correction amount for each correction axis direction.

Figure 4:
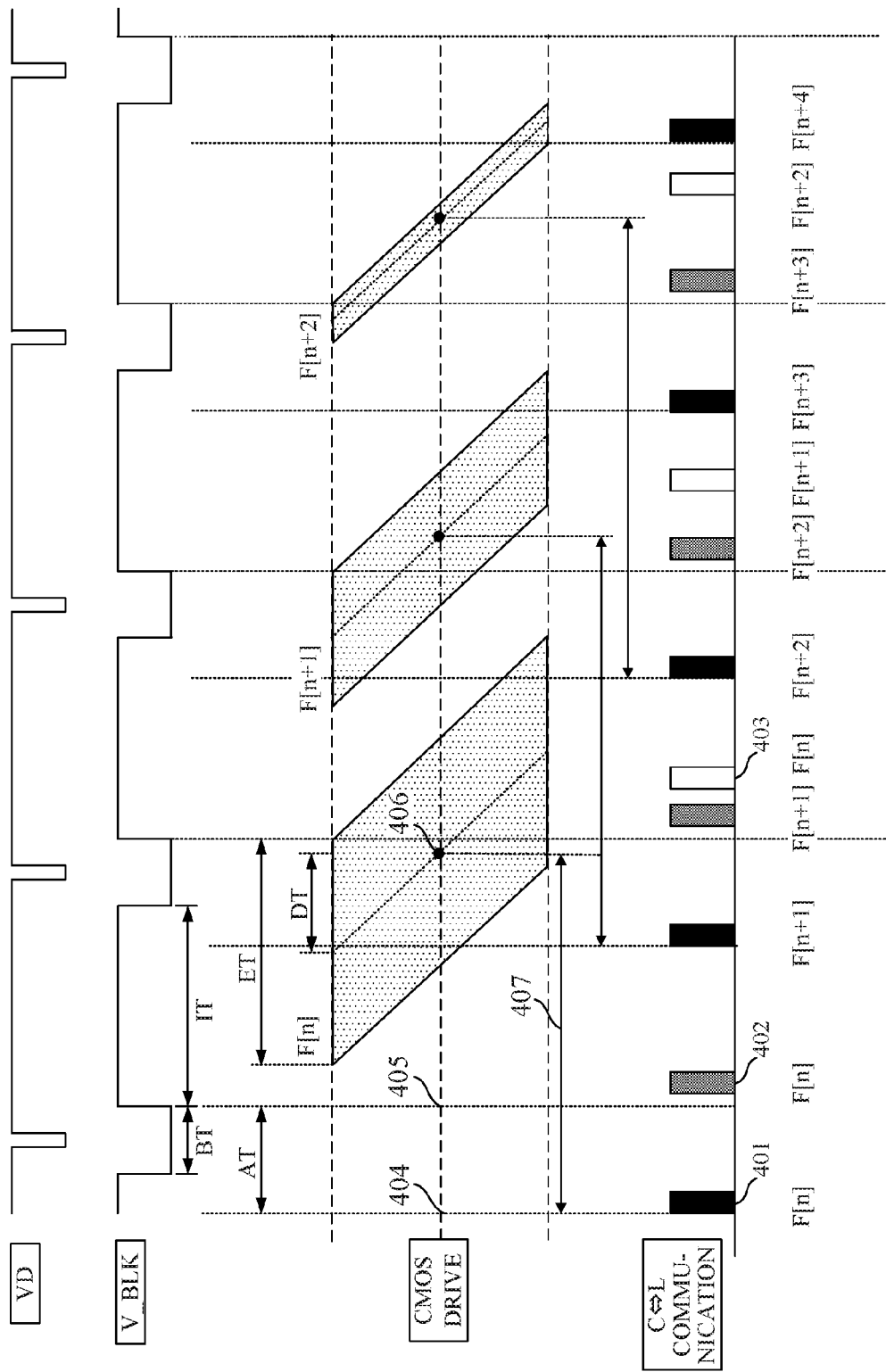
FIG. 4 illustrates communications performed between the camera body and the lens unit and their times.

FIG. 4 is a time chart of communications performed between the camera and lens controller 124 and 111. In order to perform the optical image stabilization and the electronic image stabilization, the camera controller 124 has to provide to the lens controller 111 an exposure centroid time 406 that is a time corresponding to a centroid of an exposure amount (in other words, an exposure centroid) in the image capturer 115. However, the camera and lens controllers 124 and 111 perform various communications relating not only to the image stabilization, but also to AF (autofocus), AE (auto exposure) and others. If a communication time of the exposure centroid time 406 fluctuates due to overlap with other communications and thereby the exposure centroid time 406 cannot be accurately provided to the lens controller 111, an insufficient image stabilization control may be performed. Thus, in this embodiment the camera controller 124 performs, in order to prevent a time lag (communication time lag) of the communication for providing the exposure centroid time 406 to the lens controller 111, two communication processes for separately providing a reference time and a relative time period.

Furthermore, a large amount of information communicated between the camera and lens controllers 124 and 111 makes it difficult to complete the image stabilization within a predetermined time. Moreover, in order to use various lens units, it is necessary to be capable of performing the image stabilization regardless of their specifications. Thus, in this embodiment the lens unit L (that is, the lens controller 111) performs the optical image stabilization in the lens unit L, and provides to the camera body C information (that is, the lens electronic image stabilization correction amount) used in the electronic image stabilization performed in the camera body C.

In FIG. 4, VD represents a time of a vertical synchronization signal, and V_BLK represents a time of start of a vertical blanking time period. Furthermore, "CMOS drive" represents a drive state of the image sensor, and the communications between the camera body C and the lens unit L are illustrated at the lowest part of FIG. 4. FIG. 4 illustrates a time 404 of a first communication 401 (this time is hereinafter referred to as "a first communication time"), a time 405 at which the exposure time period is set (this time is hereinafter referred to as "an exposure time period setting time"), and an exposure centroid time 406. In addition, F[n] represents an n-th frame as an image-capturing frame (hereinafter simply referred to as "a frame"). Time periods illustrated in FIG. 4 are as follows.

BT: the vertical blanking time period
IT: an image time period
AT: a time period from the first communication time 404 to the exposure time period setting time 405.
ET: an exposure time period
DT: a delay time from a center of the exposure time period ET to the exposure centroid time 406

The exposure centroid time 406 from the exposure time period setting time 405 is calculated as follows using the center of the exposure time period ET.

IT+BT−ET/2+DT

A parallelogram illustrated at each frame indicates the exposure amount. As an area of the parallelogram decreases, the exposure amount decreases. A time at a centroid of the parallelogram corresponds to the exposure centroid time 406. At a time point (a right-upper apex of the parallelogram) at which the exposure time period ET elapses from a time point (a left-upper apex of the parallelogram) at which the exposure is started, signal read-out from the image sensor is started.

In response to the vertical synchronous signal (VD) of the image capturer 115, the camera controller 124 performs, at the first communication time 404, the first communication 401 to the lens controller 111. The first communication 401 transmits a time as a reference (reference time) for causing the lens controller 111 to acquire the exposure centroid time 406. That is, the lens controller 111 acquires, at the time of receiving the first communication 401, a time (timer time) counted by its internal timer as the reference time for calculating the exposure centroid time 406. The first communication time 404 at which the first communication 401 is performed may be a time identical to the vertical synchronization signal, or may be shifted before or after the vertical synchronization signal. However, in the latter case, the first communication 401 is performed at each frame with a fixed time difference relative to the vertical synchronization signal. In addition, the first communication time 404 is set such that the first communication 401 does not overlap other communications. In FIG. 4, the first communication time 404 is set to a time before (previous to) the vertical synchronization signal.

Next, the camera controller 124 performs a second communication 402 to the lens controller 111. The second communication 402 transmits, to the lens controller 111, information on a relative time period 407 from the first communication time 404 and information on the electronic image stabilization possible range B at a current focal length. The second communication 402 is performed at a time (hereinafter referred to as "a second communication time") after a time 405 at which the exposure time period in a frame in which the exposure centroid time 406 is transmitted from the camera controller 124 to the lens controller 111 is set. Thereby, in a case where the exposure time period is changed in each frame, the lens controller 111 can accurately acquire the exposure centroid time 406. The exposure centroid time 406 is calculated using the set exposure time period and a time period (signal read-out time period) required to the signal read-out from the image sensor, and then the relative time period 407 from the first communication time 404 as the reference time is calculated. That is, the relative time period 407 is calculated by:

AT+IT+BT−ET/2+DT.

The exposure time period setting time 405 in each frame is not fixed.

The lens controller 111 receives information on the relative time period 407 from the camera controller 124 through the second communication 402. Thereby, the lens controller 111 can acquire, using the internal timer, the exposure centroid time 406 corresponding to a time after the relative time period 407 has elapsed from the reference time received through the first communication 401.

Furthermore, the lens controller 111 receives information on the electronic image stabilization possible range B through the second communication 402, and calculates, using the information, the optical image stabilization possible range A in the lens unit 111 and the coefficient K used in the divider 205. The lens controller 111 acquires, at the exposure centroid time 406, the lens shake signal from the lens shake detector 110. The divider 205 divides the total image stabilization correction amount into the optical image stabilization correction amount and the lens electronic image stabilization correction amount. The lens controller 111 holds the lens electronic image stabilization correction amount divided from the total image stabilization correction amount in its internal memory until receiving a communication request from the camera controller 124.

Thereafter, the camera controller 124 performs a third communication 403 to the lens controller 111. In the third communication 403, the lens controller 111 having received the communication request from the camera controller 124 transmits the lens electronic image stabilization correction amount having been divided from the total image stabilization correction amount and held in the internal memory to the camera controller 124. The third communication 403 is performed at a time (third communication time) after the exposure centroid time 406. At the third communication time, since the camera controller 124 has already acquired the exposure centroid time 406, the third communication 403 is performed at an arbitrary time after the exposure centroid time 406. The camera controller 124 sends the lens electronic image stabilization correction amount received from the lens controller 111 to the camera image stabilization controller 123. The electronic image stabilization correction amount setter 306 in the camera image stabilization controller 123 sets the final electronic image stabilization correction amount by using the pixel number equivalent correction amounts acquired from the lens electronic image stabilization correction amounts (for the pitch and yaw directions) and the camera image stabilization correction amount (for the roll direction).

The camera controller 124 performs the first to third communications 401 to 403 in each frame. As described above, the camera controller 124 transmits through the first communication 401 the reference time to the lens controller 111, and transmits though the second communication 402 the relative time period 407 from the reference time and the electronic image stabilization possible range B. Then, the camera controller 124 acquires through the third communication 403 the lens electronic image stabilization correction amount from the lens controller 111.

On the other hand, the lens controller 111 acquires through the first communication 401 the reference time, and receives through the second communication 402 the relative time period 407 from the reference time to acquire the exposure centroid time 406. The lens controller 111 further acquires through the second communication 402 the electronic image stabilization possible range B. Then, the lens controller 111 transmits the lens electronic image stabilization correction amount divided from the total image stabilization correction amount acquired at the exposure centroid time 406 to the camera controller 124 through the third communication 403.

Figures 5, 6:
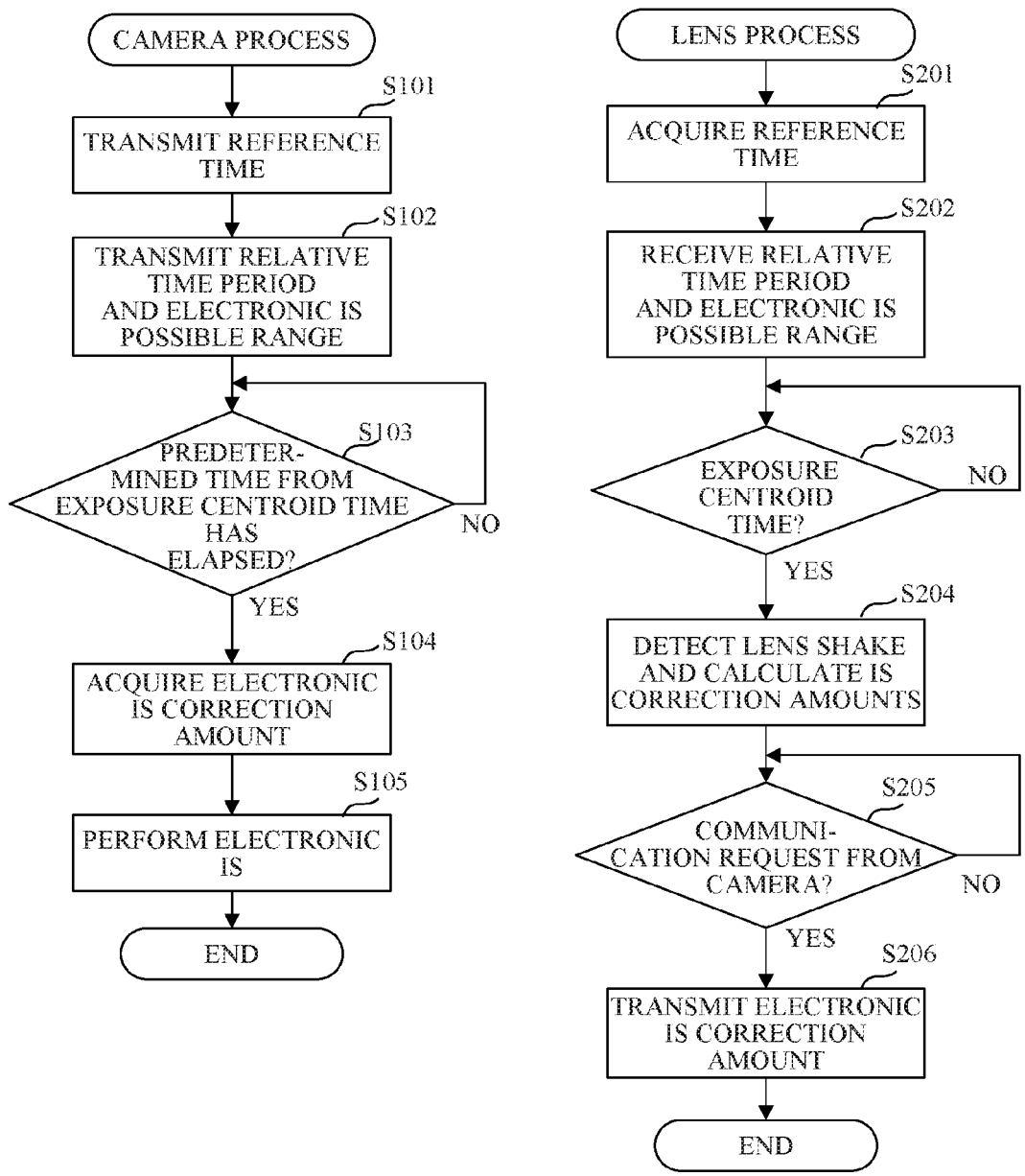
FIG. 5 is a flowchart of a communication process performed by the camera body.
FIG. 6 is a flowchart of a communication process performed by the lens unit.

FIG. 5 illustrates a flowchart of a communication process (and an image stabilization process) performed by the camera controller 124. FIG. 6 illustrates a flowchart of a communication process performed by the lens controller 111. The camera controller 124 and the lens controller 111 each constituted as a computer including a CPU execute these processes according to communication and image stabilization control programs as computer programs.

At step S101 in FIG. 5, the camera controller 124 performs the first communication 401 to the lens controller 111 at the first communication time 404 to cause the lens controller 111 to acquire the reference time for acquiring the exposure centroid time 406.

Next, at step S102, the camera controller 124 performs the second communication 402 to transmit the relative time period 407 from the reference time to the lens controller 111. Thereby, the camera controller 124 acquires itself the exposure centroid time 406, and causes the lens controller 111 to acquire the exposure centroid time 406. Furthermore, at step S102, the camera controller 124 transmits, to the lens controller 111 through the second communication 402, information on the electronic image stabilization possible range B at a current focal length.

Next, at step S103, the camera controller 124 determines whether or not a predetermined time period has elapsed from the exposure centroid time 406. If the predetermined time period has elapsed from the exposure centroid time 406, the camera controller 124 proceeds to step S104, and otherwise repeats the determination at step S103. The reason for waiting for the elapse of the predetermined time period is that the camera controller 124 transmits a transmission request to the lens controller 111 for requesting the lens controller 111 to transmit the lens electronic image stabilization correction amount after the lens controller 111 completes acquiring the lens electronic image stabilization correction amount from the total image stabilization correction amount acquired at the exposure centroid time 406.

At step S104, the camera controller 124 performs the third communication 403 to the lens controller 111 to acquire the lens electronic image stabilization correction amount acquired at the exposure centroid time 406.

Next, at step S105, the camera controller 124 sets the final electronic image stabilization correction amount by using the lens electronic image stabilization correction amount acquired at step S104 and the camera electronic image stabilization correction amount. Then, the camera controller 124 causes the camera image stabilization controller 123 to perform the electronic image stabilization using the final electronic image stabilization correction amount.

On the other hand, at step S201 in FIG. 6, the lens controller 111 receives the first communication 401 from the camera controller 124 to acquire a timer time at the first communication time 404 as the reference time for acquiring the exposure centroid time 406.

Next at step S202, the lens controller 111 receives the second communication 402 from the camera controller 124 to acquire the relative time period 407 from the reference time. The lens controller 111 causes the lens image stabilization controller 106 to acquire the exposure centroid time 406 using the reference time and the relative time period 407. The lens controller 111 further acquires the electronic image stabilization possible range B through the second communication 402. Then, the lens controller 111 causes the lens image stabilization controller 106 to calculate the coefficient K used by the divider 205 from this electronic image stabilization possible range B and the optical image stabilization possible range A in the lens unit L, and to calculate, using the coefficient K, the optical image stabilization correction amount and the lens electronic image stabilization correction amount.

Next at step S203, the lens controller 111 determines whether or not the timer time has reached the exposure centroid time 406. If the timer time has reached the exposure centroid time 406, the lens controller 111 proceeds to step S204, and otherwise repeats the determination at step S203.

At step 204, the lens controller 111 acquires, at the exposure centroid time 406, the lens shake signal from the lens shake detector 110. Then, the lens controller 111 causes the lens image stabilization controller 106 to calculate the total image stabilization correction amount from the lens shake signal, and to divide, using the coefficient K, the total image stabilization correction amount into the optical image stabilization correction amount and the lens electronic image stabilization correction amount. The lens controller 111 temporarily stores the lens electronic image stabilization correction amount in its internal memory until receiving the transmission request from the camera controller 124.

Next at step S205, the lens controller 111 determines whether or not having received the communication request for the third communication 403 from the camera controller 124. If having received the communication request for the third communication 403, the lens controller 111 proceeds to step S206, and otherwise repeats the determination at step S205.

At step S206, the lens controller 111 receives the third communication 403, and in response thereto, transmits the lens electronic image stabilization correction amount temporarily stored in its internal memory at step S204 to the camera controller 124.

Description will hereinafter be made of examples, as first to third embodiments, of a process performed by the lens and camera controllers 111 and 124 when a communication delay occurs between the lens unit L (that is, the lens controller 111) and the camera body C (that is, the camera controller 124) in the above-described camera system.

Embodiment 1

When the communication delay occurs between the lens unit L (lens controller 111) and the camera body C (camera controller 124), the camera controller 124 performs, before receiving a response from the lens controller 111, the electronic image stabilization using the electronic image stabilization correction amount set for a previous frame. Then, in response to receiving the response from the lens controller 111, the camera controller 124 resets the electronic image stabilization correction amount.

Figure 7:
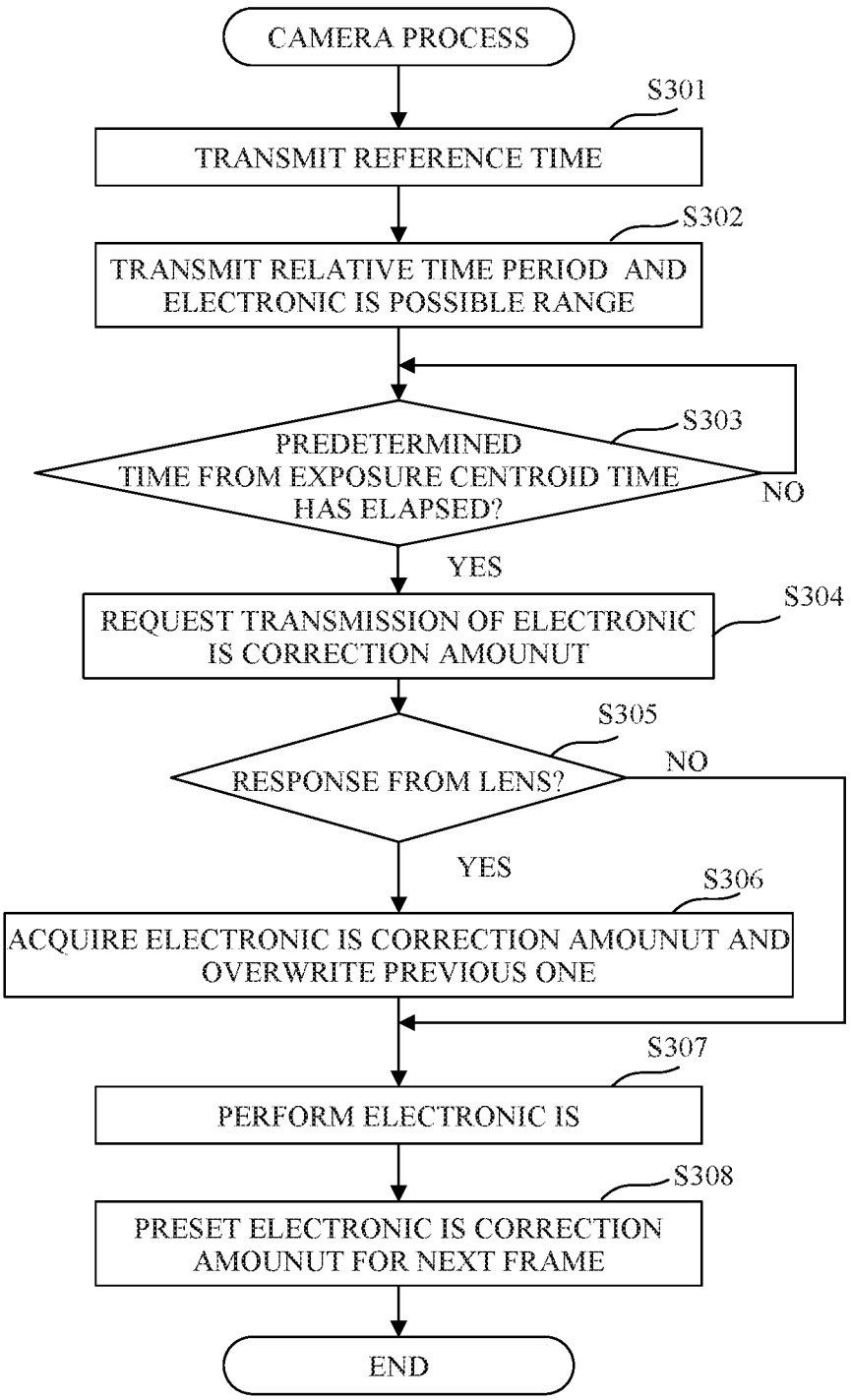
FIG. 7 is a time chart of communications performed between the camera body and the lens unit in Embodiment 1.

FIG. 7 is a flowchart of a communication process performed by the camera controller 124. As described above, the camera controller 124 executes the process according to the communication and image stabilization control program.

At step S301 in FIG. 7, the camera controller 124 performs the first communication 401 to the lens controller 111 at the first communication time 404 to cause the lens controller 111 to acquire the reference time for acquiring the exposure centroid time 406.

Next, at step S302, the camera controller 124 performs the second communication 402 to transmit the relative time period 407 from the reference time to the lens controller 111. Thereby, the camera controller 124 acquires itself the exposure centroid time 406, and causes the lens controller 111 to acquire the exposure centroid time 406. Furthermore, the camera controller 124 transmits, to the lens controller 111 through the second communication 402, information on the electronic image stabilization possible range B at a current focal length.

Next, at step S303, the camera controller 124 determines whether or not a predetermined time period has elapsed from the exposure centroid time 406. If the predetermined time period has elapsed from the exposure centroid time 406, the camera controller 124 proceeds to step S304, and otherwise repeats the determination at step S303.

The reason for waiting for the elapse of the predetermined time period at S303 is that, as described at step S103, the camera controller 124 transmits the transmission request to the lens controller 111 for requesting the lens controller 111 to transmit the lens electronic image stabilization correction amount after the lens controller 111 completes acquiring the lens electronic image stabilization correction amount from the total image stabilization correction amount acquired at the exposure centroid time 406.

At step S304, the camera controller 124 performs the third communication 403 to the lens controller 111 to request the lens controller 111 to transmit the lens electronic image stabilization correction amount divided from the total image stabilization correction amount by the lens controller 111 at the exposure centroid time 406.

Next, at step S305, the camera controller 124 determines whether or not having received a response (that is, transmission of the lens electronic image stabilization correction amount) to the third communication 403 from the lens controller 111. If having received the response from the lens controller 111, the camera controller 124 proceeds to step S306, and otherwise proceeds to step S307.

At step S306, the camera controller 124 provides the lens electronic image stabilization correction amount received from the lens controller 111 to the camera image stabilization controller 123 to cause the electronic image stabilization correction amount setter 306 to set the electronic image stabilization correction amount by using this lens electronic image stabilization correction amount and the camera electronic image stabilization correction amount. At this time, the electronic image stabilization correction amount setter 306 overwrites the electronic image stabilization correction amount preset at step S308 described later for the previous frame to reset a new electronic image stabilization correction amount.

At step S307, the camera controller 124 causes the camera image stabilization controller 123 to perform the electronic image stabilization using the electronic image stabilization correction amount preset at step S308 described next for the previous frame or the electronic image stabilization correction amount reset at step S306.

At step S308, the camera controller 124 presets the electronic image stabilization correction amount for a next frame (first frame). The electronic image stabilization correction amount preset at this step is equal to the electronic image stabilization correction amount set at previous step S306. In other words, when viewed from the next frame, the same electronic image stabilization correction amount as that for a frame (second frame) previous to the next frame.

As just described, the camera controller 124 presets the electronic image stabilization correction amount for the next frame before receiving the response (transmission of the lens electronic image stabilization correction amount) from the lens controller 111 in the next frame, which enables performing the electronic image stabilization without receiving the response.

In this embodiment described above, the camera controller 124 presets the electronic image stabilization correction amount for the next frame before receiving the response from the lens controller 111, and resets, if receiving the response, the electronic image stabilization correction amount using the response. Thereby, the camera controller 124 can perform the electronic image stabilization without receiving the response from the lens controller 111, which enables preventing image blur from occurring due to unsmoothness of the electronic image stabilization.

Furthermore, this embodiment can provide a camera system capable of eliminating a determination of a time of switching to use of another electronic image stabilization correction amount when the camera controller 124 does not receive the response from the lens controller 111.

Embodiment 2

Next, description will be made of a second embodiment (Embodiment 2) of the present invention. In Embodiment 1 the camera controller 124 presets, before receiving the response from the lens controller 111, the electronic image stabilization correction amount for the previous frame as the electronic image stabilization correction amount for the next frame. On the other hand, in this embodiment the camera controller 124 switches, depending on a detection result of the camera shake detected by the camera shake detector 122, the preset electronic image stabilization correction amount between one used for the previous frame and one acquired by prediction calculation. Using the electronic image stabilization correction amount acquired by the prediction calculation enables the camera controller 124 to enhance the image stabilization effect without receiving the response from the lens controller 111.

Figure 8:
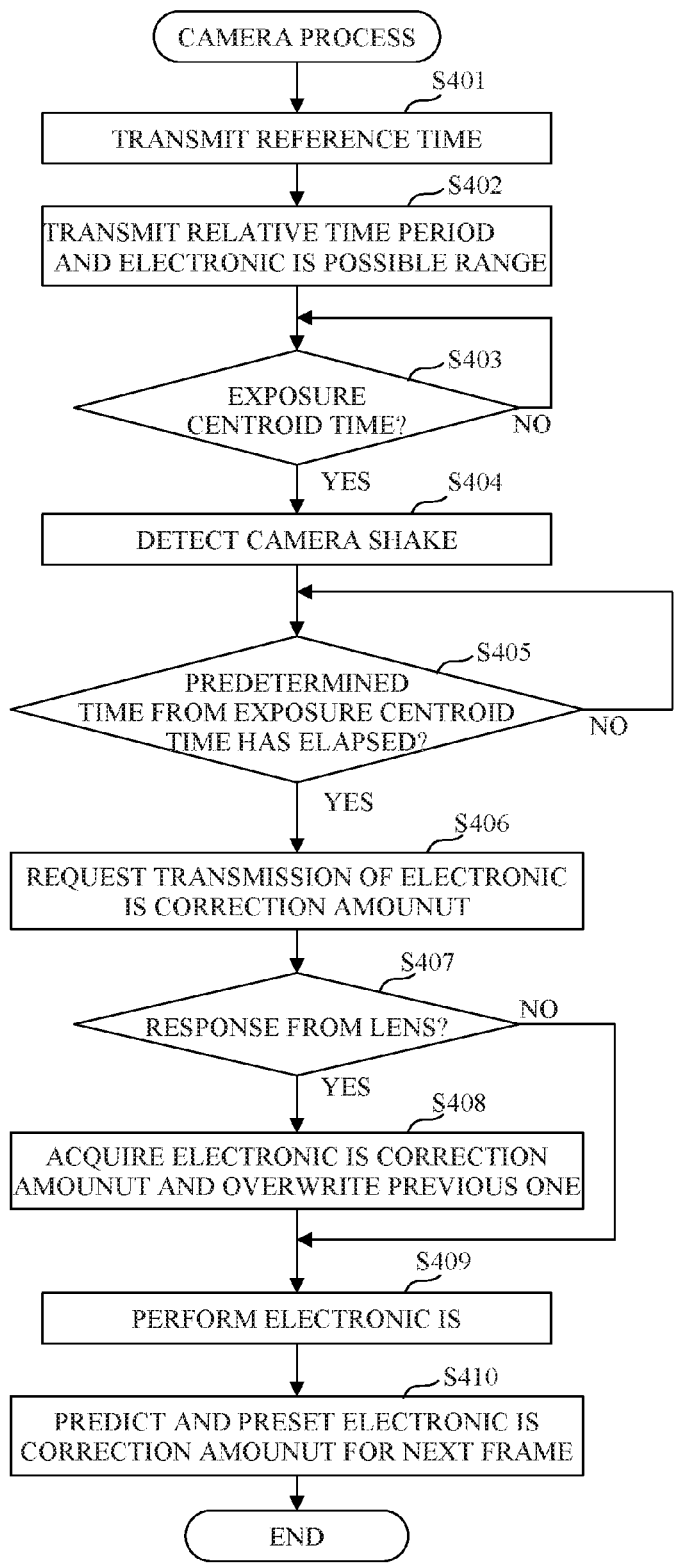
FIG. 8 is a flowchart of a communication process performed by the lens unit in Embodiment 2.

FIG. 8 illustrates a flowchart of a communication process (and an image stabilization process) performed by the camera controller 124.

At step S401, the camera controller 124 performs the first communication 401 to the lens controller 111 at the first communication time 404 to cause the lens controller 111 to acquire the reference time for acquiring the exposure centroid time 406.

Next, at step S402, the camera controller 124 performs the second communication 402 to transmit the relative time period 407 from the reference time to the lens controller 111. Thereby, the camera controller 124 acquires itself the exposure centroid time 406, and causes the lens controller 111 to acquire the exposure centroid time 406. Furthermore, at step S402, the camera controller 124 transmits, to the lens controller 111 through the second communication 402, information on the electronic image stabilization possible range B at a current focal length.

Next at step S403, the camera controller 124 determines whether or not a timer time counted by a timer provided therein has reached the exposure centroid time 406. If the timer time has reached the exposure centroid time 406, the camera controller 124 proceeds to step S404, and otherwise repeats the determination at step S403.

At step S404, the camera controller 124 acquires a magnitude of the camera shake as an angular displacement (hereinafter referred to as "a camera shake amount") detected by the camera shake detector 122 at the exposure centroid time 406. The camera controller 124 switches the electronic image stabilization correction amount preset at subsequent step S410 for a next frame.

Next at step S405, the camera controller 124 determines whether or not a predetermined time period has elapsed from the exposure centroid time 406. If the predetermined time period has elapsed from the exposure centroid time 406, the camera controller 124 proceeds to step S406, and otherwise repeats the determination at step S405. The reason for waiting for the elapse of the predetermined time at step S405 is the same as that described at step 303 in FIG. 7.

At step S406, the camera controller 124 performs the third communication 403 to the lens controller 111 to request the lens controller 111 to transmit the lens electronic image stabilization correction amount divided from the total image stabilization correction amount by the lens controller 111 at the exposure centroid time 406.

Next at step S407, the camera controller 124 determines whether or not a response (that is, transmission of the lens electronic image stabilization correction amount) from the lens controller 111 having received the third communication 403. If having received the response from the lens controller 111, the camera controller 124 proceeds to step S408, and otherwise proceeds to step S409.

At step S408, the camera controller 124 transmits the lens electronic image stabilization correction amount received from the lens controller 111 to the camera image stabilization controller 123 to cause the electronic image stabilization correction amount setter 306 to set the electronic image stabilization correction amount by using this lens electronic image stabilization correction amount and the camera electronic image stabilization correction amount. At this time, the electronic image stabilization correction amount setter 306 overwrites the electronic image stabilization correction amount preset at step S410 described later for a previous frame to reset a new electronic image stabilization correction amount.

At step S409, the camera controller 124 causes the camera image stabilization controller 123 to perform the electronic image stabilization using the electronic image stabilization correction amount preset at step S410 described next for the previous frame or the electronic image stabilization correction amount reset at step S408.

Furthermore, at step S410, the camera controller 124 presets the electronic image stabilization correction amount for the next frame (first frame). The camera controller 124 changes the electronic image stabilization correction amount set at this step depending on the camera shake amount acquired at previous step 404, which is different from step S308 in FIG. 7. For example, when the camera shake amount is smaller than a predetermined amount, the camera shake amount is approximately equal to that for the previous frame. Therefore, the camera controller 124 uses that electronic image stabilization correction amount for the previous frame (second frame) without change. On the other hand, when the camera shake amount is larger than the predetermined amount, the camera controller 124 uses a predicted electronic image stabilization correction amount acquired by prediction calculation using the electronic image stabilization correction amounts set for multiple previous (past) frames (second frames). Specifically, the camera controller 124 performs the prediction calculation by a known method such as a linear interpolation method using the electronic image stabilization correction amounts set for the multiple past frames.

Since the exposure time periods are different in the respective frames, it is desirable that the camera controller 124 perform the prediction calculation in consideration of the exposure time periods. Specifically, since the exposure centroid times are different from each other depending on the exposure times for the respective frames, the camera controller 124 performs the prediction calculation in consideration of the exposure centroid times in the multiple past frames and the electronic image stabilization correction amounts for those frames. Furthermore, it is desirable that the camera controller 124 perform the prediction calculation of the electronic image stabilization correction amount preset for the next frame, using not only the lens electronic image stabilization correction amount received in the past from the lens controller 111 but also the camera shake amounts acquired through the camera shake detector 122.

Although in this embodiment the camera controller 124 acquires the camera shake amount from the gyro sensor as the camera shake detector 122, the camera controller 124 may acquire the camera shake amount from motion vectors detected by the image-capturing signal processor 116. For example, when the camera shake amount is large, the camera controller 124 may use only the camera shake amount acquired through the camera shake detector 122. On the other hand, when the camera shake amount is small, the camera controller 124 may use only the camera shake amount acquired using the motion vectors.

Also in this embodiment, the camera controller 124 presets the electronic image stabilization correction amount for the next frame before receiving the response from the lens controller 111, and resets, if receiving the response, the electronic image stabilization correction amount using the response. Furthermore, the camera controller 124 switches, depending on the camera shake amount, the preset electronic image stabilization correction amount between one used for the previous frame and one acquired by the prediction calculation using the electronic image stabilization correction amount used for the multiple past frames. Thereby, the camera controller 124 can perform the electronic image stabilization without receiving the response from the lens controller 111, which enables preventing image blur from occurring due to unsmoothness of the electronic image stabilization. In addition, using the electronic image stabilization correction amount acquired by the prediction calculation enables enhancing the image stabilization effect.

Furthermore, this embodiment also can provide a camera system capable of eliminating a determination of a time of switching to use of another electronic image stabilization correction amount when the camera controller 124 does not receive the response from the lens controller 111.

Embodiment 3

Next, description will be made of a third embodiment (Embodiment 3) of the present invention. In this embodiment the camera controller 124 uses a time difference between a time at which the camera controller 124 receives the lens electronic image stabilization correction amount from the lens controller 111 and a time at which the camera controller 124 sets the electronic image stabilization correction amount. Furthermore, the camera controller 124 performs prediction calculation of a preset electronic image stabilization correction amount using the camera shake amount for a temporally previous frame relative to a prediction calculation target frame.

Figure 9:
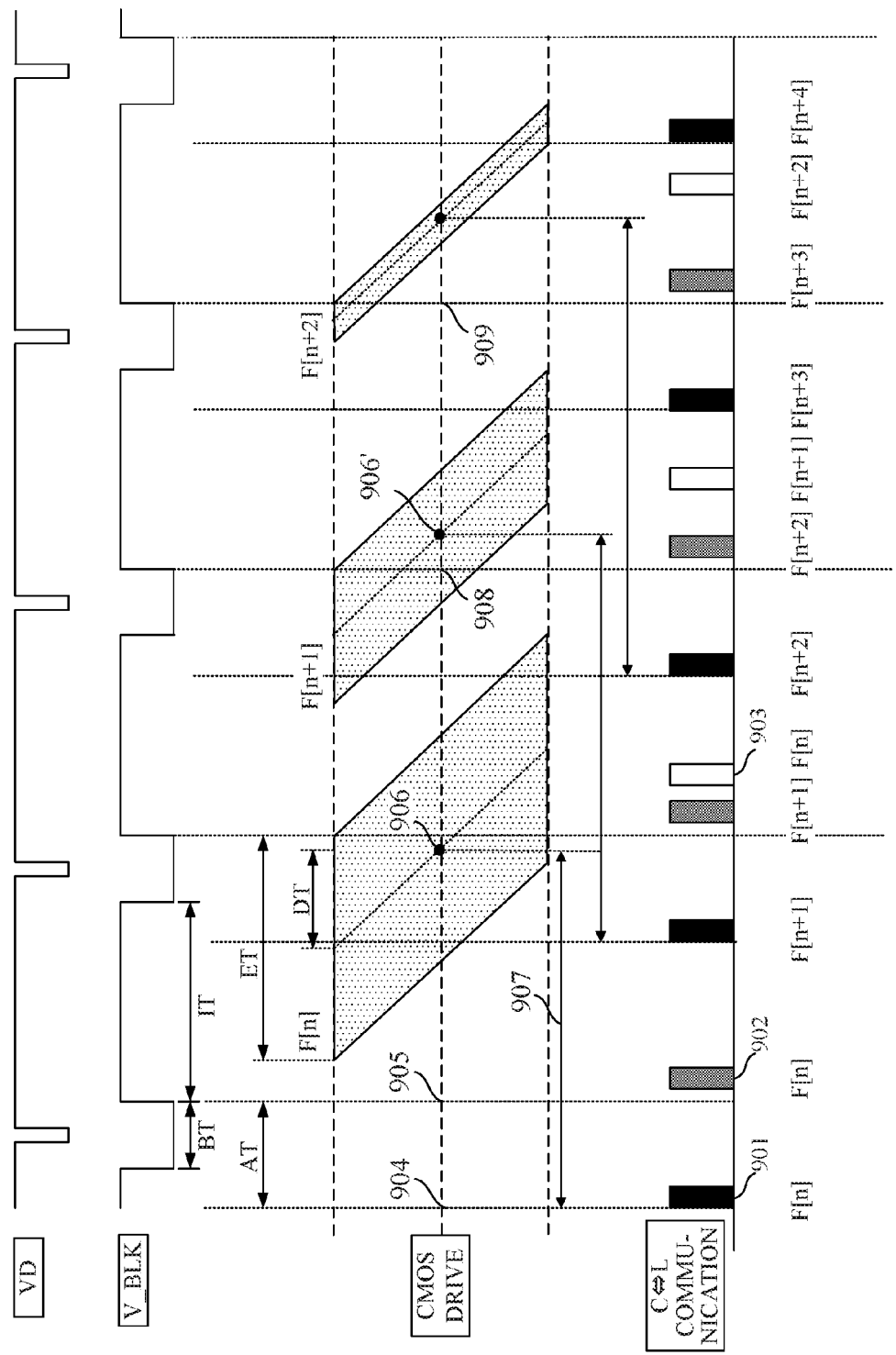
FIG. 9 is a flowchart of a communication process performed by the camera body in Embodiment 1.

FIG. 9 illustrates times of communications between the camera controller 124 and the lens controller 111, and times at which the lens electronic image stabilization correction amounts received by the camera controller 124 from the lens controller 111 are reflected. In FIG. 9, communications and times denoted by reference numerals 901 to 906 are the same as those denoted by reference numerals 401 to 406 in FIG. 4, respectively. Times 908 and 909 will be described below.

The camera controller 124 receives, from the lens controller 111, the lens electronic image stabilization correction amount for a frame F[n] at a time of the third communication 903. The electronic image stabilization correction amount setter 306 finally sets, depending on this received lens electronic image stabilization correction amount, the electronic image stabilization correction amount for the frame F[n]. However, a time at which the electronic image stabilization correction amount is used for the image stabilization as a video clipping process depends on an entire process sequence of the camera system. The entire process sequence is controlled so as to perform not only video clipping process, but also a series of video signal processes.

For example, in a case where the lens electronic image stabilization correction amount received through the third communication 903 is used for the electronic image stabilization at the time 908, the time 908 is before an exposure centroid time 906' in a next frame F(n+1). In addition, the time 908 is before the lens electronic image stabilization correction amount for the next frame F[n+1] is received by the camera controller 124 (that is, before the third communication 903). Thus, it is necessary that the camera controller 124 acquire the electronic image stabilization correction amount for the frame F[n] by prediction calculation using the electronic image stabilization correction amount in a frame before the frame F[n].

On the other hand, in a case where the lens electronic image stabilization correction amount received through the third communication 903 is used for the electronic image stabilization at the time 909, the time 909 is after the exposure centroid time 906' in the next frame F(n+1). In addition, the time 909 is after the lens electronic image stabilization correction amount for the next frame F[n+1] is received by the camera controller 124. In this case, the electronic image stabilization correction amount for the frame F[n] can be acquired using not only the electronic image stabilization correction amount for the frame before the frame F[n] but also the electronic image stabilization correction amount for a frame F[n+1] (third frame) after (in the future than) the frame F[n].

Using the electronic image stabilization correction amounts for the past and future frames as just described enables improving accuracy of the prediction calculation.

As described above, in this embodiment the camera controller 124 uses the time difference between the time of receiving the lens electronic image stabilization correction amount and the time of setting the electronic image stabilization correction amount using the lens electronic image stabilization correction amount to perform the prediction calculation using the electronic image stabilization correction amount for the future frame after the prediction calculation target frame. The prediction calculation using not only the electronic image stabilization correction amount for the past frame but also the electronic image stabilization correction amount for the future frame enables improving the accuracy of the prediction calculation and further enhancing the image stabilization effect when the response from the lens controller 111 is not received.

Embodiments 1 to 3 described the case where, in order to prevent the image blur from occurring due to the unsmoothness of the image stabilization control when the camera controller 124 does not receive the response from the lens controller 111 due to the communication delay, the camera controller 124 presets the electronic image stabilization correction amount. However, presetting the electronic image stabilization correction amount is effective also for other cases. For example, when a communication error such as a difference of communication times between the camera controller 124 and the lens controller 111 occurs, it is necessary to perform a communication reset process (communication restoration process) for restoring normal communication. During this communication reset process the camera controller 124 cannot receive the response from the lens controller 111, so that it is desirable that the camera controller 124 preset the electronic image stabilization correction amount when performing the communication reset process.

Furthermore, when the camera controller 124 cannot receive the lens electronic image stabilization correction amount from the lens controller 111 over multiple frames before the lens communication reset process ends, accuracy of the preset electronic image stabilization correction amount may be decreased. In such a case, gradually decreasing a gain (image stabilization gain) for the electronic image stabilization performed by the camera image stabilization controller 123 in the camera body C enables producing a motion image providing less feeling of strangeness due to the electronic image stabilization.

As described above, Embodiments 1 to 3 enables, even when the camera body C does not receive the first image stabilization information from the lens unit L due to the communication delay between the camera body C and the lens unit L, preventing the image blur from occurring due to the unsmoothness of the electronic image stabilization.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-165618, filed on Aug. 26, 2016, which is hereby incorporated by reference herein in its entirety.

What is claimed is:

1. An image-capturing apparatus to which a lens apparatus is detachably attachable, the image-capturing apparatus comprising: at least one processor or one circuit which function as:
    a camera communicator configured to enable communication with the lens apparatus;
    a camera controller configured to perform the communication with the lens apparatus through the camera communicator; and
    a camera image stabilizer configured to perform, using image stabilization information, an image stabilization operation for reducing image blur,
    wherein the camera controller is configured:
    to set, before receiving from the lens apparatus first image stabilization information produced by the lens apparatus depending on a shake of the lens apparatus, second image stabilization information usable for the image stabilization operation,
    to cause the camera image stabilizer, when receiving the first image stabilization information, to perform the image stabilization operation using the first image stabilization information; and
    to cause the camera image stabilizer, when not receiving the first image stabilization information, to perform the image stabilization operation using the second image stabilization information,
    wherein the camera image stabilizer is configured to switch image stabilization information used in the image stabilization operation between the first image stabilization information and the second image stabilization information between when the camera controller receives the first stabilization information and when the camera controller does not receive the first stabilization information, and
    wherein the camera image stabilizer is configured to perform the image stabilization operation using the first image stabilization information when the camera controller receives the first image stabilization information, and perform the image stabilization operation using the second image stabilization information when the camera controller does not receive the first image stabilization information.

2. An image-capturing apparatus according to claim 1, wherein:
    the camera image stabilizer is configured to perform the image stabilization operation in each frame of image capturing performed by the image-capturing apparatus; and
    the camera controller is configured to set the second image stabilization information for a first frame, using the first image stabilization information received from the lens apparatus for a second frame before the first frame.

3. An image-capturing apparatus according to claim 1, wherein:
    the camera image stabilizer is configured to perform the image stabilization operation in each frame of image capturing performed by the image-capturing apparatus; and
    the camera controller is configured to set the second image stabilization information for a first frame, by prediction calculation using the first image stabilization information received from the lens apparatus for each of multiple second frames before the first frame.

4. An image-capturing apparatus according to claim 1, wherein:
    the camera image stabilization controller is configured to perform the image stabilization operation in each frame of image capturing performed by the image-capturing apparatus; and
    the camera controller is configured to set the second image stabilization information for a first frame, by prediction calculation using the first image stabilization information received from the lens apparatus for each of a second frame before the first frame and a third frame after the first frame.

5. An image-capturing apparatus according to claim 1, wherein:
    the camera image stabilizer is configured to perform the image stabilization operation in each frame of image capturing performed by the image-capturing apparatus; and
    the camera controller is configured:
    to set, when a shake of the image-capturing apparatus is larger than a predetermined value, the second image stabilization information for a first frame by prediction calculation using the first image stabilization information received from the lens apparatus for each of multiple second frames before the first frame; and
    to set, when the shake of the image-capturing apparatus is smaller than the predetermined value, the second image stabilization information for the first frame by using the first image stabilization information received from the lens apparatus for a second frame before the first frame.

6. An image-capturing apparatus according to claim 1, wherein the camera controller is configured to set, when a communication restoration process is performed for restoring the communication from a communication error between the lens apparatus and the image-capturing apparatus, the second image stabilization information before receiving the first image stabilization information from the lens apparatus.

7. A lens apparatus detachably attachable to an image-capturing apparatus that is configured to perform, using image stabilization information, an image stabilization operation for reducing image blur, the lens apparatus comprising:
    a lens communicator configured to enable communication with the image-capturing apparatus;

a lens controller configured to perform the communication with the image-capturing apparatus through the lens communicator;

a lens shake detector configured to detect a shake of the lens apparatus; and a lens image stabilizer configured to produce first image stabilization information depending on the shake of the lens apparatus, wherein the image-capturing apparatus is configured:

to set, before receiving the first image stabilization information from the lens controller, second image stabilization information usable for the image stabilization operation, to perform, when receiving the first image stabilization information, the image stabilization operation using the first image stabilization information; and to perform, when not receiving the first image stabilization information, the image stabilization operation using the second image stabilization information, wherein the image capturing apparatus is configured to switch image stabilization information used in the image stabilization operation between the first image stabilization information and the second image stabilization information between when the image capturing apparatus receives the first stabilization information and when the image capturing apparatus does not receive the first stabilization information, and wherein the image capturing apparatus is configured to perform the image stabilization operation using the first image stabilization information when the image capturing apparatus receives the first image stabilization information, and perform the image stabilization operation using the second image stabilization information when the image capturing apparatus does not receive the first image stabilization information.

8. An image-capturing system including an image-capturing apparatus and an accessory apparatus detachably attachable to the image-capturing apparatus, wherein:

the lens apparatus comprises:

a lens communicator configured to enable communication with the image-capturing apparatus;

a lens controller configured to perform the communication with the image-capturing apparatus through the accessory communicator;

a lens shake detector configured to detect a shake of the lens apparatus; and a lens image stabilizer configured to produce first image stabilization information depending on the shake of the lens apparatus; and the image-capturing apparatus comprises at least one processor or one circuit which function as:

a camera communicator configured to enable communication with the lens apparatus;

a camera controller configured to perform the communication with the lens apparatus through the camera communicator; and a camera image stabilizer configured to perform, using image stabilization information, an image stabilization operation for reducing image blur, wherein the camera controller is configured:

to set, before receiving the first image stabilization information from the lens controller, second image stabilization information usable for the image stabilization operation, to cause the camera image stabilizer, when receiving the first image stabilization information, to perform the image stabilization operation using the first image stabilization information; and to cause the camera image stabilizer, when not receiving the first image stabilization information, to perform the image stabilization operation using the second image stabilization information, wherein the camera image stabilizer is configured to switch image stabilization information used in the image stabilization operation between the first image stabilization information and the second image stabilization information between when the camera controller receives the first stabilization information and when the camera controller does not receive the first stabilization information, and wherein the camera image stabilizer is configured to perform the image stabilization operation using the first image stabilization information when the camera controller receives the first image stabilization information, and perform the image stabilization operation using the second image stabilization information when the camera controller does not receive the first image stabilization information.

9. An image-stabilizing method for an image-capturing apparatus to which a lens apparatus is detachably attachable, the method comprising the steps of:

causing the image-capturing apparatus to perform communication with the lens apparatus;

causing the image-capturing apparatus to perform, using image stabilization information, an image stabilization operation for reducing image blur;

causing the image-capturing apparatus to set, before the lens apparatus receives first image stabilization information produced by the lens apparatus depending on a shake of the lens apparatus, second image stabilization information usable for the image stabilization operation;

causing the image-capturing apparatus receiving the first image stabilization information to perform the image stabilization operation using the first image stabilization information; and causing the image-capturing apparatus not receiving the first image stabilization information to perform the image stabilization operation using the second image stabilization information, wherein the image capturing apparatus is configured to switch image stabilization information used in the image stabilization operation between the first image stabilization information and the second image stabilization information between when the image capturing apparatus receives the first stabilization information and when the image capturing apparatus does not receive the first stabilization information, and wherein the image capturing apparatus is configured to perform the image stabilization operation using the first image stabilization information when the image capturing apparatus receives the first image stabilization information, and perform the image stabilization operation using the second image stabilization information when the image capturing apparatus does not receive the first image stabilization information.

10. A non-transitory storage medium storing a computer program for causing a computer in an image-capturing apparatus to which a lens apparatus is detachably attachable to execute an image-stabilizing method, the method comprising the steps of:

causing the image-capturing apparatus to perform communication with the lens apparatus;

causing the image-capturing apparatus to perform, using image stabilization information, an image stabilization operation for reducing image blur;

causing the image-capturing apparatus to set, before the lens apparatus receives first image stabilization information produced by the lens apparatus depending on a shake of the lens apparatus, second image stabilization information usable for the image stabilization operation;

causing the image-capturing apparatus receiving the first image stabilization information to perform the image stabilization operation using the first image stabilization information; and causing the image-capturing apparatus not receiving the first image stabilization information to perform the image stabilization operation using the second image stabilization information, wherein the image capturing apparatus is configured to switch image stabilization information used in the image stabilization operation between the first image stabilization information and the second image stabilization information between when the image capturing apparatus receives the first stabilization information and when the image capturing apparatus does not receive the first stabilization information, and wherein the image capturing apparatus is configured to perform the image stabilization operation using the first image stabilization information when the image capturing apparatus receives the first image stabilization information, and perform the image stabilization operation using the second image stabilization information when the image capturing apparatus does not receive the first image stabilization information.

11. An image-capturing apparatus according to claim 1, wherein the camera controller is configured to set the second image stabilization information using the first image stabilization information received from the lens apparatus.

12. An image-capturing apparatus according to claim 11, wherein the camera controller is configured to set the second image stabilization information for a first timing, using the first image stabilization information received from the lens apparatus for a second timing before the first timing.

13. An image-capturing apparatus according to claim 12, wherein the camera controller is configured to set the second image stabilization information for a first timing, by prediction calculating using the first image stabilization information received from the lens apparatus for each of multiple second timings before the first timing.

* * * * *